United States Patent
Tian et al.

(10) Patent No.: US 10,557,718 B2
(45) Date of Patent: Feb. 11, 2020

(54) AUXILIARY CONTROL METHOD AND SYSTEM FOR UNMANNED AERIAL VEHICLE

(71) Applicant: Haoxiang Electric Energy (Kunshan) Co., Ltd., Kunshan, Jiangsu (CN)

(72) Inventors: Yu Tian, Jiangsu (CN); Wenyan Jiang, Jiangsu (CN)

(73) Assignee: Haoxiang Electric Energy (Kunshan) Co., Ltd., Kunshan, Jiangsu (CN)

( * ) Notice: Subject to any disclaimer, the term of this patent is extended or adjusted under 35 U.S.C. 154(b) by 146 days.

(21) Appl. No.: 15/848,657

(22) Filed: Dec. 20, 2017

(65) Prior Publication Data

US 2018/0202831 A1    Jul. 19, 2018

(30) Foreign Application Priority Data

Dec. 20, 2016   (CN) .......................... 2016 1 1185378

(51) Int. Cl.
*G01C 23/00* (2006.01)
*B64C 39/02* (2006.01)
*G05D 1/00* (2006.01)

(52) U.S. Cl.
CPC ............ *G01C 23/00* (2013.01); *B64C 39/024* (2013.01); *G05D 1/0011* (2013.01); *B64C 2201/146* (2013.01)

(58) Field of Classification Search
CPC ........ G01C 23/00; G01C 21/005; G08G 5/00; G05D 1/0011; B64C 39/024; B64C 2201/146
See application file for complete search history.

(56) References Cited

U.S. PATENT DOCUMENTS

| | | | | |
|---|---|---|---|---|
| 6,847,865 | B2* | 1/2005 | Carroll | B64C 39/024 244/190 |
| 2016/0117853 | A1* | 4/2016 | Zhong | B64C 39/024 345/634 |
| 2016/0163207 | A1* | 6/2016 | Kim | G08G 5/04 701/301 |
| 2018/0074487 | A1* | 3/2018 | Song | B64C 39/024 |
| 2018/0157253 | A1* | 6/2018 | Margolin | B64C 39/024 |
| 2019/0011908 | A1* | 1/2019 | Liu | B64C 39/024 |
| 2019/0182428 | A1* | 6/2019 | Huang | H04N 5/144 |

OTHER PUBLICATIONS

Chen et al.; Configuration of Sensors on Small-scale Autonomous Helicopter; Proc. of the 2006 IEEE Intl. Conf. on Information Acquisition; Aug. 20-23, 2006; Shandong, China (Year: 2006).*

* cited by examiner

*Primary Examiner* — Michael J Zanelli

(57) ABSTRACT

An auxiliary control method and an auxiliary control system for an unmanned aerial vehicle (UAV) are provided. The auxiliary control method for the UAV includes steps of: based on a flight attitude and a flight speed of the UAV, predicting a flight path of the UAV in a scheduled time; and providing information about the flight path of the UAV in the scheduled time to an operator of the UAV. The auxiliary control method and system for the UAV provided by the present invention are able to provide the information about the flight path of the UAV in the scheduled time to the operator of the UAV, so as to help the operator of the UAV make a control decision for the UAV.

10 Claims, 3 Drawing Sheets

Auxiliary control method 100

AUXILIARY CONTROL METHOD AND SYSTEM FOR UNMANNED AERIAL VEHICLE

CROSS REFERENCE OF RELATED APPLICATION

The application claims priority under 35 U.S.C. 119(a-d) to CN 201611185378.9, filed Dec. 20, 2016.

BACKGROUND OF THE PRESENT INVENTION

Field of Invention

The present invention relates to a field of unmanned aerial vehicle, and more particularly to an auxiliary control method and an auxiliary control system for an unmanned aerial vehicle.

Description of Related Arts

The unmanned aerial vehicle (UAV) is an aircraft flies without carrying people and is realized based on the wireless remote control system located on the ground or the automatic control system carried on the UAV. The UAV has advantages of small volume, low cost, light weight, convenient operation and flexible flying, and is able to adapt the severe environment which many manned aircrafts fail to adapt. Thus, the UAV is widely applied in the related fields, such as the military field, the civilian field and the scientific research field.

The UAV system mainly comprises three parts respectively of a flight control system, a system comprising the gimbal and the camera, and an image transmission system, wherein the flight control system is for controlling the UAV to complete the whole flight process including taking off, flying and returning; the system comprising the gimbal and the camera is for collecting images of the specified scene in different angles during the flight process of the UAV; and the image transmission system is for transmitting the images collected by the system comprising the gimbal and the camera during the flight process of the UAV to the ground, so that the images can be viewed by the related personnel.

Generally, the operator of the UAV directly observes the flight attitude and the flight environment of the UAV with two eyes, and controls the UAV to complete the various flight actions through the wireless remote controller (namely the wireless remote control system located on the ground). In recent years, with the development of the wireless communication technology and the miniaturization of the electronic equipment, the first person view (FPV) has gradually become the popular control method of the UAV. The operator of the UAV, like a real air pilot, sees the images "before the eyes" which are namely the images transmitted to the ground by the image transmission system and controls the UAV to complete the various flight actions through the wireless remote controller. Even during the taking off and/or landing process of the UAV, the operator does not need to have a look at the UAV, which brings the real experience of aircraft piloting to the operator of the UAV.

Conventionally, when using the FPV method to control the UAV, unlike the human eyes can position the UAV through the binocular stereo vision, the image captured by the single camera carried on the UAV does not contain the depth information. Thus, the operator of the UAV cannot know how far is the object in the image from the UAV, which brings the difficulty to the operator of the UAV to control the UAV.

SUMMARY OF THE PRESENT INVENTION

An object of the present invention is to provide an auxiliary control method and an auxiliary control system for an unmanned aerial vehicle (UAV), so as to help an operator of the UAV control the UAV in a first person view control mode.

According to the present invention, an auxiliary control method for a UAV comprises steps of: based on a flight attitude and a flight speed of the UAV, predicting a flight path of the UAV in a scheduled time; and, providing information about the flight path of the UAV in the scheduled time to an operator of the UAV.

Preferably, when the operator of the UAV controls the UAV, the flight path of the UAV in the scheduled time is predicted further based on a rudder degree of the UAV and operation information for controlling a wireless remote controller of the UAV from the operator of the UAV.

Preferably, information about the flight attitude of the UAV is provided by a flight attitude sensor carried on the UAV.

Preferably, information about the flight speed of the UAV is provided by an airspeed sensor carried on the UAV.

Preferably, the flight path of the UAV in the scheduled time is predicted further based on a three-dimensional position of the UAV.

Preferably, information about the three-dimensional position of the UAV is provided by a differential global positioning system (GPS) carried on the UAV; and the differential GPS comprises a GPS antenna and a GPS receiver.

The present invention further provides an auxiliary control system for a UAV, comprising:

a flight path predicting unit, which is configured to predict a flight path of the UAV in a scheduled time based on a flight attitude and a flight speed of the UAV; and an information providing unit, which is configured to provide information about the flight path of the UAV in the scheduled time to an operator of the UAV.

Preferably, when the operator of the UAV controls the UAV, the flight path predicting unit predicts the flight path of the UAV in the scheduled time further based on a rudder degree of the UAV and operation information for controlling a wireless remote controller of the UAV from the operator of the UAV.

Preferably, information about the flight attitude of the UAV is provided by a flight attitude sensor carried on the UAV.

Preferably, information about the flight speed of the UAV is provided by an airspeed sensor carried on the UAV.

Preferably, the flight path predicting unit predicts the flight path of the UAV in the scheduled time further based on a three-dimensional position of the UAV.

Preferably, information about the three-dimensional position of the UAV is provided by a differential GPS carried on the UAV; and the differential GPS comprises a GPS antenna and a GPS receiver.

According to the present invention, the auxiliary control method and system for the UAV are able to provide the information about the flight path of the UAV in the scheduled time to the operator of the UAV. Based on the information about the flight path of the UAV in the scheduled time, the operator of the UAV can know whether the UAV in the scheduled time will have a collision with one or multiple surrounding objects, so as to make a control decision for the UAV.

BRIEF DESCRIPTION OF THE DRAWINGS

Through reading the following detailed description of the preferred embodiment of the present invention with the FIG. 1 is a flow chart of an auxiliary control method for an unmanned aerial vehicle (UAV) according to a preferred embodiment of the present invention.

DETAILED DESCRIPTION OF THE PREFERRED EMBODIMENT

The features of various aspects and the preferred embodiment of the present invention are described in detail as follows. In the following detailed description, many details are presented, so as to provide a comprehensive understanding of the present invention. For one skilled in the art, it is obvious that the present invention can be implemented with omitting some details. The description of the following preferred embodiment is merely for illustrating an example of the present invention, so as to provide a better understanding of the present invention. The present invention is not limited to any specific configuration and algorithm described as follows, but includes all the modifications, replacements and improvements covering the elements, parts and algorithms without departing from the spirit of the present invention. In the accompanying drawings and the following description, the common structure and technology are not presented, so as to avoid a misunderstanding of the present invention.

The present invention provides an auxiliary control method and an auxiliary control system for an unmanned aerial vehicle (UAV), so as to help an operator of the UAV control the UAV. The auxiliary control method and system for the UAV, provided by the preferred embodiment of the present invention, are described in detail as follows with the accompanying drawings.

Figure 1:
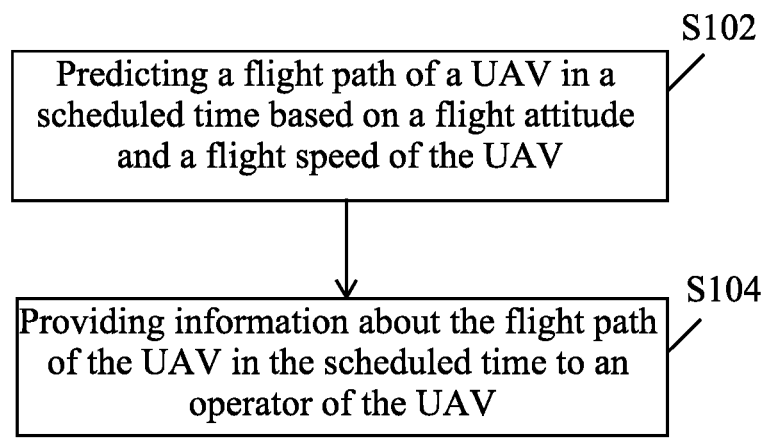

FIG. 1 is a flow chart of the auxiliary control method for the UAV provided by the preferred embodiment of the present invention. As shown in FIG. 1, the auxiliary control method 100 comprises steps of: S102, based on a flight attitude and a flight speed of the UAV, predicting a flight path of the UAV in a scheduled time; and S104, providing information about the flight path of the UAV in the scheduled time to an operator of the UAV.

The flight attitude and the flight speed of the UAV can be the flight attitude and the flight speed of the UAV at a current moment, and can also be the flight attitude and the flight speed of the UAV at a moment before the current moment. The flight path of the UAV in the scheduled time means the flight path of the UAV in the scheduled time after the current moment.

Figure 2:
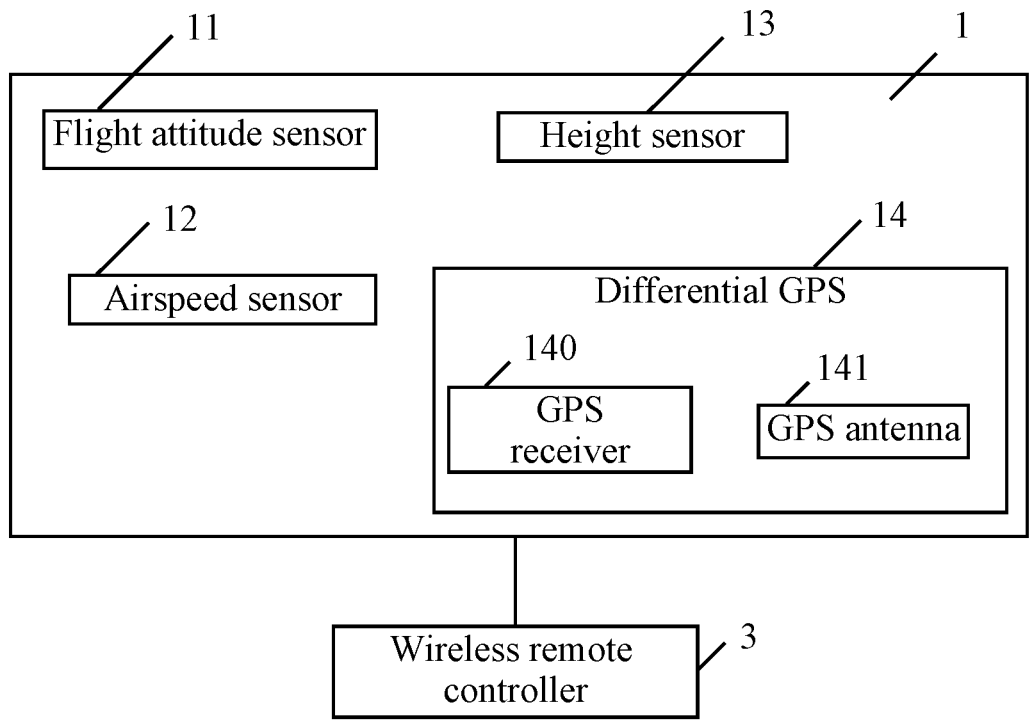
FIG. 2 is a sketch view of a communication connection between the UAV and a wireless remote controller according to the preferred embodiment of the present invention.

Referring to FIG. 2, a communication connection is established between the UAV and a wireless remote controller 3. When the operator of the UAV controls the UAV, the flight path of the UAV in the scheduled time can be predicted further based on a rudder degree of the UAV and operation information for controlling the wireless remote controller of the UAV from the operator of the UAV. The rudder degree of the UAV means a control degree that can be realized by a control signal of the wireless remote controller for controlling the UAV. For example, at a condition of 100% rudder degree for a pitch channel, when the operator of the UAV forward pushes a full rudder, the control signal of the wireless remote controller can realize 100% of the control degree; and, at a condition of 80% rudder degree for left and right channels, when the operator of the UAV leftward pushes the full rudder, the control signal of the wireless remote controller can realize 80% of the control degree, which is equivalent that the operator of the UAV actually pushes 80% of the full rudder. When the UAV is set to have a relatively low rudder degree, the UAV has the relatively low control sensitivity, and thus is suitable for a novice to practice. A rudder degree switch is arranged on many UAVs, and the operator of the UAV can set an expected rudder degree in advance, so as to control the UAV more stably.

In order to provide the information about the flight path of the UAV in the scheduled time more accurately, the flight path of the UAV in the scheduled time can be predicted further based on a three-dimensional position of the UAV. Under the circumstance, the flight path of the UAV in the scheduled time with respect to the three-dimensional position at the current moment, namely a more accurate flight path of the UAV in the scheduled time, can be provided to the operator of the UAV.

Various sensors are generally carried on the UAV, for sensing the flight attitude, flight speed, flight height and three-dimensional position of the UAV. For example, a flight attitude sensor can be carried on the UAV, for sensing the flight attitude of the UAV; an airspeed sensor can be carried, for sensing the flight speed of the UAV; a height sensor can be carried for sensing the flight height of the UAV; and a differential global positioning system (GPS) can be carried for sensing the three-dimensional position of the UAV. According to the preferred embodiment of the present invention, referring to FIG. 2, the UAV comprises a UAV body 1, wherein a flight attitude sensor 11, an airspeed sensor 12, a height sensor 13 and a differential GPS 14 are arranged on the UAV body 1.

Information about the flight attitude of the UAV can be obtained from the flight attitude sensor 11 carried on the UAV, namely provided by the flight attitude sensor 11 carried on the UAV; information about the flight speed of the UAV can be obtained from the airspeed sensor 12 carried on the UAV, namely provided by the airspeed sensor 12 carried on the UAV; and, information about the three-dimensional position of the UAV can be obtained from the differential GPS 14 carried on the UAV, namely provided by the differential GPS 14 carried on the UAV.

The flight attitude sensor 11 can be realized by a vertical gyroscope which is able to sense a flight attitude angle of the UAV; the airspeed sensor 12 can be realized by a combination of a static pressure sensor, a dynamic pressure (or total pressure) sensor and a total temperature sensor; and, the differential GPS 14 can comprise a GPS receiver 140 and a GPS antenna 141, so as to provide the information about the three-dimensional position of the UAV and related time data.

The information about the flight path of the UAV in the scheduled time can be provided to the operator of the UAV through a sound signal and/or a video signal. For example, a voice prompt message about the flight path of the UAV in the scheduled time can be played to the operator of the UAV;

and, an animation prompt message about the flight path of the UAV in the scheduled time can also be played to the operator of the UAV.

The auxiliary control method for the UAV is described above in detail with FIG. 1; and an auxiliary control system for the UAV, which is able to realize the auxiliary control method shown in FIG. 1, is described in detail as follows with FIG. 3.

Figure 3:
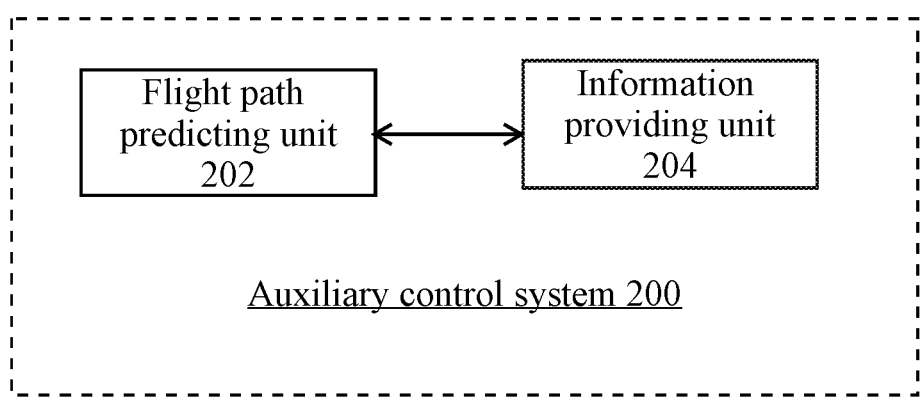
FIG. 3 is a sketch view of an auxiliary control system for the UAV according to the preferred embodiment of the present invention.

FIG. 3 is a sketch view of the auxiliary control system for the UAV provided by the preferred embodiment of the present invention. As shown in FIG. 3, the auxiliary control system 200 comprises a flight path predicting unit 202 and an information providing unit 204, wherein: the flight path predicting unit 202 is configured to predict a flight path of the UAV in a scheduled time based on a flight attitude and a flight speed of the UAV; and, the information providing unit 204 is configured to provide information about the flight path of the UAV in the scheduled time to an operator of the UAV.

When the operator of the UAV controls the UAV, the flight path predicting unit can predict the flight path of the UAV in the scheduled time further based on a rudder degree of the UAV and operation information for controlling a wireless remote controller of the UAV from the operator of the UAV. When not only the information about the flight path of the UAV in the scheduled time needs to be provided but information about a relative relation between the flight path of the UAV in the scheduled time and a three-dimensional position at a current moment also needs to be provided, the flight path predicting unit can predict the flight path of the UAV in the scheduled time further based on the three-dimensional position of the UAV.

The flight path predicting unit can obtain the information about the flight attitude, flight speed and three-dimensional position of the UAV from a receiver of an image transmission system in a UAV system through a wired and/or wireless communication. Alternatively, the flight path predicting unit can obtain the information about the flight attitude, flight speed and three-dimensional position of the UAV from a transmitter of the image transmission system in the UAV system through the wireless communication. The transmitter of the image transmission system in the UAV system obtains the above information from the flight attitude sensor, the airspeed sensor and the differential GPS carried on the UAV through the wired and/or wireless communication, and then transmits the information to the receiver and/or the flight path predicting unit.

The information providing unit can provide the information about the flight path of the UAV in the scheduled time to the operator of the UAV through a sound signal and/or a video signal. For example, the information providing unit can send the information about the flight path of the UAV in the scheduled time to a smart phone used by the operator of the UAV; then through the smart phone, a voice prompt message about the flight path of the UAV in the scheduled time and/or an animation prompt message about the flight path of the UAV in the scheduled time can be played to the operator of the UAV.

Other details of the auxiliary control system for the UAV are similar as that of the auxiliary control method for the UAV described with FIG. 1 and not repeated again.

The auxiliary control method and system for the UAV provided by the preferred embodiment of the present invention are able to provide the information about the flight path of the UAV in the scheduled to the operator of the UAV. Based on the information about the flight path of the UAV in the scheduled time, the operator of the UAV can know whether the UAV in the scheduled time will have a collision with one or multiple surrounding objects, so as to make a control decision for the UAV.

Figure 4:
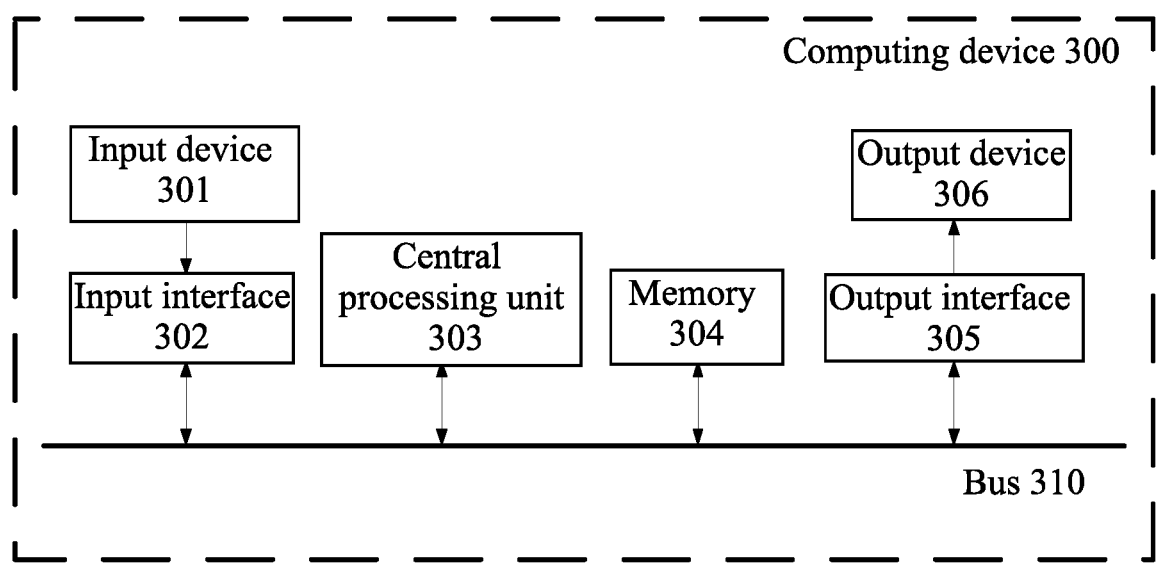
FIG. 4 is a sketch view of a hardware architecture of a computing device according to the preferred embodiment of the present invention, wherein the computing device is able to realize the auxiliary control method and system for the UAV.

The auxiliary control method and system for the UAV described with FIGS. 1-2 can be realized through a computing device integrated in a wireless control system located on the ground or a computing device which is independent from the wireless communication system located on the ground. FIG. 4 is a sketch view of a hardware architecture of the computing device which is able to realize the auxiliary control method and system for the UAV. As shown in FIG. 4, the computing device 300 comprises an input device 301, an input interface 302, a central processing unit 303, a memory 304, an output interface 305 and an output device 306, wherein: the input interface 302, the central processing unit 303, the memory 304 and the output interface 305 are connected with each other through a bus 310; the input device 301 and the output device 306 are connected with the bus 310 respectively through the input interface 302 and the output interface 305, so as to connect with other parts of the computing device 300.

The input device 301 receives input information from an exterior of the computing device, such as from the wireless control system located on the ground or the receiver, and then transmits the input information to the central processing unit 303 through the input interface 302; the central processing unit 303 processes the input information based on a computer executable instruction stored in the memory 304 and generates output information, then stores the output information temporarily or permanently in the memory 304, and transmits the output information to the output device 306 through the output interface 305; and, the output device 306 outputs the output information to the exterior of the computing device 300 for the users. That is to say, it is feasible that the auxiliary control system 200 for the UAV shown in FIG. 3 comprises a memory in which a computer executable instruction is stored and a processer, wherein the processer can realize the auxiliary control method for the UAV described with FIG. 1 when executing the computer executable instruction.

It is noted that the present invention is not limited to the specific configuration and implementation which are described above and shown in figures. For brief description, the detailed description about the conventional methods is omitted. In the above preferred embodiment, the specific steps are described and showed as an example. However, the process of the method provided by the present invention is not limited to the above described and showed specific steps. One skilled in the art can make various changes, modifications and additions, or change a sequence of the steps based on the spirit of the present invention.

The functional modules shown in the sketch views can be the hardware, software, firmware or the combination thereof. When being realized by means of hardware, the modules can be the electronic circuit, application specific integrated circuit (ASIC), appropriate firmware, plug-in, function card and so on. When being realized by means of software, the elements of the present invention can be the program or code segment for executing the required task. The program or the code segment can be stored in the machine-readable medium or be transmitted in the transmission medium or the communication link through the data signal in the carrier wave. The machine-readable medium comprises every medium can store or transmit the information. For example, the machine-readable medium can be the electronic circuit, semiconductor memory device, read-only memory (ROM), flash memory, erasable read-only memory (EROM), soft disk, CD-ROM, light disk, hard disk, fiber medium, and radio frequency (RF) link. The code segment can be downloaded from the computer network such as the Internet and Intranet.

The present invention can be realized in other forms without departing from the spirit and substantive characteristics of the present invention. For example, the algorithm described in the preferred embodiment can be modified, while the system architecture is not departing from the basic spirit of the present invention. Thus, the preferred embodiment is exemplary only and not for limiting the present invention. The protection range of the present invention is defined by the following claims, not by the above description. Moreover, all modifications encompassed in the range of the definition and equivalents of the claims are included in the protection range of the present invention.

What is claimed is:

1. An auxiliary control method for an unmanned aerial vehicle (UAV), comprising steps of:
    based on a flight attitude and a flight speed of the UAV, predicting a flight path of the UAV in a scheduled time; and
    providing information about the flight path of the UAV in the scheduled time to an operator of the UAV;
    wherein: when the operator of the UAV controls the UAV, the flight path of the UAV in the scheduled time is predicted further based on a rudder degree of the UAV and operation information for controlling a wireless remote controller of the UAV from the operator of the UAV.

2. The auxiliary control method for the UAV, as recited in claim 1, wherein information about the flight attitude of the UAV is provided by a flight attitude sensor carried on the UAV.

3. The auxiliary control method for the UAV, as recited in claim 1, wherein information about the flight speed of the UAV is provided by an airspeed sensor carried on the UAV.

4. The auxiliary control method for the UAV, as recited in claim 1, wherein the flight path of the UAV in the scheduled time is predicted further based on a three-dimensional position of the UAV.

5. The auxiliary control method for the UAV, as recited in claim 4, wherein: information about the three-dimensional position of the UAV is provided by a differential GPS carried on the UAV; and the differential GPS comprises a GPS antenna and a GPS receiver.

6. An auxiliary control system for a UAV, comprising:
    a flight path predicting unit, which is configured to predict a flight path of the UAV in a scheduled time based on a flight attitude and a flight speed of the UAV; and
    an information providing unit, which is configured to provide information about the flight path of the UAV in the scheduled time to an operator of the UAV;
    wherein: when the operator of the UAV controls the UAV, the flight path predicting unit predicts the flight path of the UAV in the scheduled time further based on a rudder degree of the UAV and operation information for controlling a wireless remote controller of the UAV from the operator of the UAV.

7. The auxiliary control system for the UAV, as recited in claim 6, wherein information about the flight attitude of the UAV is provided by a flight attitude sensor carried on the UAV.

8. The auxiliary control system for the UAV, as recited in claim 6, wherein information about the flight speed of the UAV is provided by an airspeed sensor carried on the UAV.

9. The auxiliary control system for the UAV, as recited in claim 6, wherein the flight path predicting unit predicts the flight path of the UAV in the scheduled time further based on a three-dimensional position of the UAV.

10. The auxiliary control system for the UAV, as recited in claim 9, wherein: information about the three-dimensional position of the UAV is provided by a differential GPS carried on the UAV; and the differential GPS comprises a GPS antenna and a GPS receiver.

* * * * *